US005384601A

United States Patent [19]

Yamashita et al.

[11] Patent Number: 5,384,601

[45] Date of Patent: Jan. 24, 1995

[54] COLOR ADJUSTMENT APPARATUS FOR AUTOMATICALLY CHANGING COLORS

[75] Inventors: Haruo Yamashita; Takashi Yumiba, both of Osaka, Japan

[73] Assignee: Matsushita Electric Industrial Co., Ltd., Osaka, Japan

[21] Appl. No.: 111,108

[22] Filed: Aug. 24, 1993

[30] Foreign Application Priority Data

Aug. 25, 1992 [JP] Japan .................................. 4-225611

[51] Int. Cl.[6] .............................................. H04N 9/64

[52] U.S. Cl. .................................... 348/577; 348/652; 348/647; 358/520

[58] Field of Search ............... 348/576, 577, 645, 646, 348/647, 649, 651, 652, 653, 654, 256, 655, 656, 659, 661; 358/518, 520, 27, 28, 29, 29 C; H04N 9/67, 9/64, 9/76

[56] References Cited

U.S. PATENT DOCUMENTS

| | | | |
|---|---|---|---|
| 4,763,186 | 8/1988 | Belmares-Sarabia | 358/22 |
| 4,812,903 | 3/1989 | Wagensonner | 358/80 |
| 4,831,434 | 5/1989 | Fuchsberger | 358/80 |

OTHER PUBLICATIONS

Gazou-Denshi-Gakkai-shi (The Journal of the Institute of Electronic Imaging Engineers), vol. 18, No. 5, pp. 302-311.

*Primary Examiner*—Victor R. Kostak
*Assistant Examiner*—Sherrie Hsia
*Attorney, Agent, or Firm*—Ratner & Prestia

[57] ABSTRACT

An automatic color adjustment apparatus for use in an imaging device for adjusting the color of a subject such as skin or leave, which is well retained in human memory, to be as natural as possible. The color adjustment apparatus has a weighting coefficient setting device for setting a weighting coefficient according to the difference between the input chromaticity value and the preselected reference chromaticity value set by a chromaticity value setting device. The preselected reference chromaticity value is selected, with respect to a particular subject, such as skin, to be equal to the most natural color of that subject in a chromaticity plane defined by hue and saturation characteristics. The color-adjusted output signal is produced from a calculator which calculates an internal division operation applied to the preselected reference chromaticity value and the input chromaticity signal using the weighting coefficient.

8 Claims, 12 Drawing Sheets

COLOR ADJUSTMENT APPARATUS FOR AUTOMATICALLY CHANGING COLORS

BACKGROUND OF THE INVENTION

1. Field of the invention

The present invention relates to an automatic color adjustment apparatus for automatically changing only those colors in a specified area to another selected color while keeping the other colors of the image unchanged. This automatic color adjustment apparatus may be used in color printers, color photocopiers, color televisions, and other color image processing devices.

2. Description of the Prior Art

A variety of adjustments are required to obtain the required color control characteristics in conventional color image processing devices. These adjustments vary from such relatively simple adjustments as overall image luminance, color density, and RGB or CMY color balance control, to adjustments using image position data, such as color conversions applied to only a certain part of the image, and even more complex adjustments of the hue, chromaticity, or luminance of colors contained within a certain area.

The common objective of these adjustments is overcoming viewer dissatisfaction with the output image. The need for these adjustments is also commonly believed to drop as the performance of the color imaging devices improves and faithful color reproduction becomes possible.

It is important to note, however, that while the performance of the imaging device is one source of dissatisfaction with image quality, the subjective, psychological needs and desires of the viewer are an equally important factor. While "faithful color reproduction" is technologically possible, "desirable color reproduction" is subject to viewer preference as influenced by "remembered colors." Remembered colors are such things as skin color and green leaves, colors that the viewer remembers as being a certain color or that "should" be a certain color.

On video printers and other hard copy output devices it is more important for colors to be reproduced as the viewer believes they should be rather than being reproduced faithfully to the source image because it is the hard copy that will be kept. This is particularly true of remembered colors, and is even more true of skin colors. Faithful reproduction of skin color is often undesirable, and is a frequent reason why color adjustment of remembered colors is required.

Skin tones acceptable to the viewing audience are often reproduced in hard copy prints from television broadcasts recorded in a study because the recordings are made under bright lights and the actors appearing in the show are wearing make-up. The "remembered" skin colors are usually not reproduced in selected scenes from dramas, and even less frequently in amateur camcorder recordings. In the latter case, this is because make-up is not used, lighting is often too low and dependent on just available light, and the use of automatic white balance causes skin tones to be affected by background colors.

Conventional color adjustment used with television adjusts the chroma phase and level, and adjusts the luminance offset to adjust the colors when demodulating the NTSC signal to an RGB signal. Specifically, the hue is adjusted by changing the chroma phase, and the saturation is adjusted by changing the chroma level. In addition, changing the luminance offset also functions as a basic brightness adjustment. This adjustment method is both simple and very effective because it adjusts the color information, which has three attributes, using the three attributes most easily perceived by man: luminance, hue, and saturation.

Furthermore, a selective color adjustment apparatus which, while being physically large, allows the user to adjust colors in a selected area by converting the input signal to a color space defined by the three attributes of luminance, hue, and saturation, rotating the hue and adjusting the saturation of specific colors in this converted color space, and then reconverting the result to the original color space (cf., Gazou-Denshi-Gakkai-shi (The Journal of the Institute of Electronic Imaging Engineers) vol. 18, No. 5, pp. 302–312).

With these conventional color adjustment apparatuses, however, color adjustment applied specifically to remembered colors is difficult, and it is even more difficult to automatically adjust remembered colors.

An example is described below using skin color of Japanese as an example of remembered color. With the color adjustment methods used in television, hue adjustment is limited to simultaneous rotation of the color axis of all colors. Saturation and luminance adjustment are similarly limited to operations affecting the entire screen image. It is therefore not possible to adjust skin color alone without also affecting all other colors in the image.

The conventional selective color adjustment apparatus rotates the color axis and adjusts the saturation characteristic for a specific color area within the color space, and if the input color area that includes the skin color can be separated from other colors, skin color can be adjusted without affecting colors in the other areas. Automating this color adjustment process is virtually impossible, however, because determining which direction the hue axis should be rotated and how the saturation should be adjusted to obtain the "desirable" skin color depends upon the hue and saturation of the input skin color and subjective viewer preferences. As a result, user intervention is unavoidable.

The problem is further complicated by the inclusion of various skin colors in a single facial image, and it would be extremely rare that the luminance, hue, and saturation characteristics of all skin colors in the input image will need to be adjusted in the same direction and by the same amount. Because the direction and degree of adjustment desirable for the remembered skin colors is normally so variable, it is not possible for all skin colors in the input image to be corrected to the remembered color by the conventional selective color adjustment apparatus even if the area containing the skin colors can be specified.

As thus described, adjusting colors to the remembered color with conventional methods is extremely difficult manually, and is even more difficult to automate.

SUMMARY OF THE INVENTION

Therefore, an object of the present invention is to provide a color adjustment apparatus for automatically determining the compensation direction for skin colors in the input image according to the direction and degree of change from a remembered color, and can thereby naturally approximate the remembered skin color. A further object of the invention is to provide this color adjustment apparatus with a simple circuit construction and high processing speed enabling real-time processing of an input video signal.

It is to be noted that the invention can also be applied in the same way to remembered colors other than skin colors.

To achieve this object, a color adjustment apparatus according to the present invention defines the luminance component in the three color attributes of the input color image signal as the input luminance signal, and the signal for the chromaticity plane expressed by the remaining two attributes as the input chromaticity signal, and comprises a chromaticity value setting means, an area setting means, a weighting coefficient setting means, and a calculation means. The chromaticity value setting means sets a predetermined reference chromaticity value. The area setting means sets the area on the chromaticity plane that includes this reference chromaticity value. The weighting coefficient setting means outputs a value of zero (0) outside the set area determined by the area setting means, and outputs a value that approaches one (1) as the distance between the reference chromaticity signal and the input chromaticity signal decreases within the set area of the area setting means. The calculation means internally divides the input chromaticity signal and the reference chromaticity signal based on the output value from the weighting coefficient setting means.

A second embodiment of the invention defines the luminance component in the three color attributes of the input color image signal as the input luminance signal, and the signal for the chromaticity plane expressed by the remaining two attributes as the input chromaticity signal, and comprises a chromaticity value setting means, an area setting means, a weighting coefficient setting means, a luminance value setting means, and a calculation means. The chromaticity value setting means sets a predetermined reference chromaticity value. The area setting means sets the area on the chromaticity plane that includes this reference chromaticity value. The weighting coefficient setting means outputs a value of zero (0) outside the set area determined by the area setting means, and outputs a value that approaches one (1) as the distance between the reference chromaticity signal and the input chromaticity signal decreases within the set area of the area setting means. The luminance value setting means sets a predetermined luminance value. The calculation means internally divides the input luminance signal and the luminance value output by the luminance value setting means based on the output from the weighting coefficient setting means.

In a color adjustment apparatus according to the first embodiment of the invention, the weighting coefficient setting means determines the weighting coefficient according to the distance on the chromaticity plane between the input chromaticity signal and the reference chromaticity signal of the remembered color set by the chromaticity value setting means for the input chromaticity signal on the chromaticity plane defined by two of the three color attributes of the input color signal, specifically hue and saturation. The chromaticity value on a line joining the coordinates of the input chromaticity signal and the reference chromaticity value is determined and output based on this weighting coefficient. The direction and degree of hue and saturation correction are therefore determined so that the input chromaticity value constantly approaches and is corrected to the reference chromaticity value.

In a color adjustment apparatus according to the second embodiment of the invention, the weighting coefficient setting means determines the weighting coefficient according to the distance on the chromaticity plane between the input chromaticity signal and the reference chromaticity signal of the remembered color set by the chromaticity value setting means for the input chromaticity signal and the input luminance signal. The luminance value on a line joining the input luminance signal and the reference luminance value output by the luminance value setting means is determined and output based on this weighting coefficient.

By means of this operation, a color adjustment apparatus according to the present invention can automatically and correctly shift the reference chromaticity value and the reference luminance value irrespective of the offset direction of the input chromaticity signal to the reference chromaticity value, and the degree of this shift can be determined freely by the weighting coefficient setting means. As a result, the corrected colors can be corrected naturally to the remembered color.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of a color adjustment apparatus according to the present invention are described hereinbelow with reference to the accompanying figures. Before proceeding to a detailed description of the construction and operation of the invention, the chromaticity signal used by the invention is first described. This chromaticity signal is expressed by two elements of the color space defined by the hue and saturation attributes of color.

A chromaticity signal representing two elements of the rectangular coordinate system of the plane representing the hue and saturation components of color could be a color difference signal of luminance-color difference signals (e.g., R—Y, B—Y, or Y, U, V signals), a chroma signal of luminance-chroma signals (YC), the observer chromaticity index (u*, v*) of the CIE 1976 uniform observer color space (L*, u*, v*), the observer chromaticity index (a*, b*) of the CIE 1976 uniform observer color space (L*, a*, b*), or the hue H and saturation S of the HLS space. The chromaticity signal of the invention is a chromaticity signal of these two attributes of hue and saturation.

Figure 1:
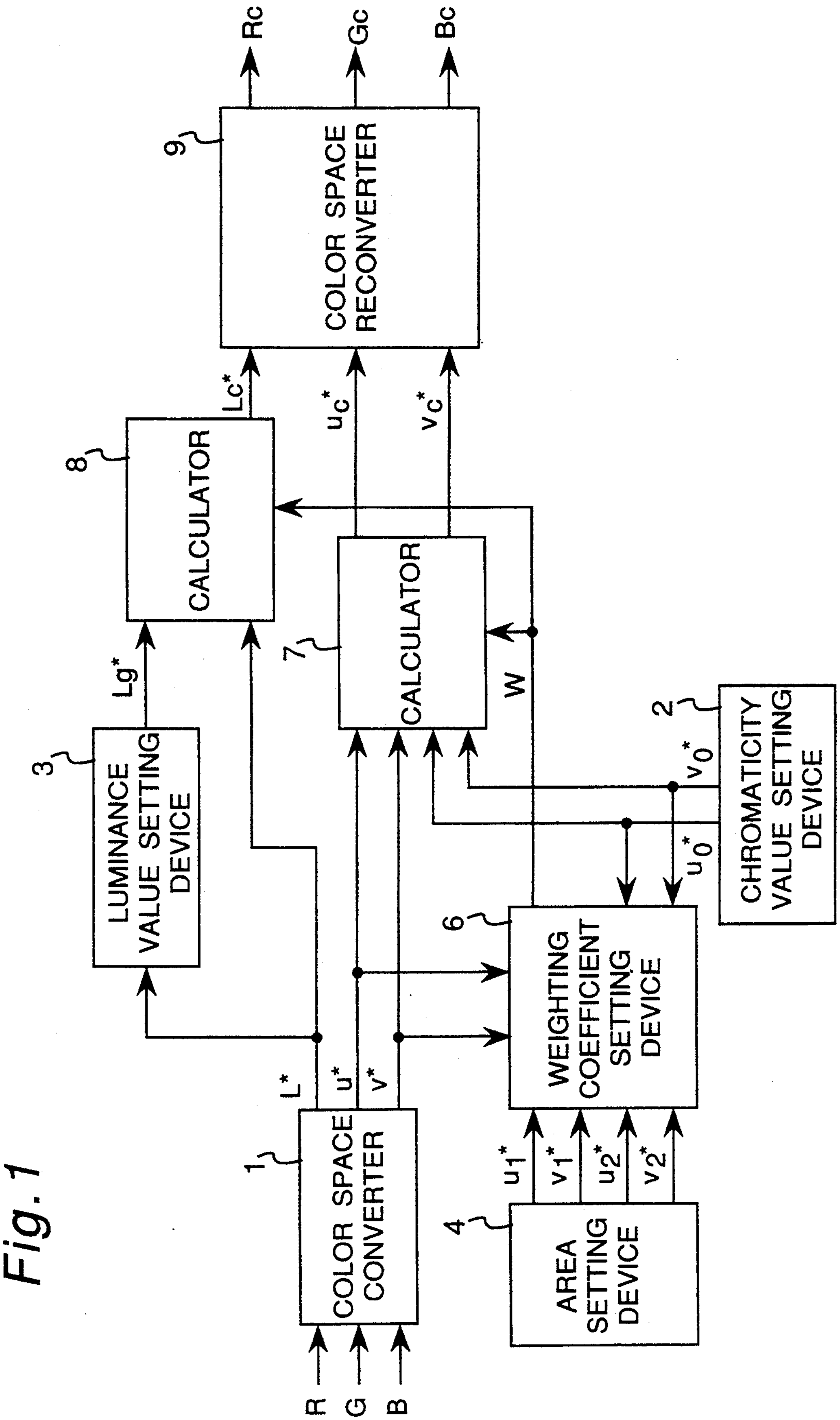
FIG. 1 is a block diagram of the first embodiment of a color adjustment apparatus according to the present invention.

FIG. 1 is a block diagram of a color adjustment apparatus according to the first embodiment of the invention. Referring to FIG. 1, the color space converter 1 converts the input color signal (an R G B signal in this embodiment) to a signal (L*, u*, v*) expressing the coordinates of the selected color space (the CIE 1976 uniform observer color space (L*, u*, v*) in this embodiment). The chromaticity value setting device 2 sets a preselected chromaticity signal (u0*, v0*) expressing the chromaticity coordinates of the reference color corresponding to a remembered color. The luminance value setting device 3 similarly sets the reference value (Lg*) for the luminance of the reference color, and the area setting device 4 sets a color adjustment area containing the target color.

For example, the chromaticity value setting device 2 sets the preselected chromaticity signal (u0*, v0*) which represents a typical skin color of a Japanese and would appear to the viewers most natural skin color of a Japanese. The skin color of a Japanese in the video signal is not always the same as the preselected chromaticity signal (u0*, v0*) but deviates towards black, white, yellow, red or to any other color. Therefore, the chromaticity signal (u0*, v0*) for the skin color of a Japanese in the video signal may vary within a range of (u0* ± Au, v0* ± Av) which is determined empirically. The area setting device 4 sets the color adjustment area within which the possible deviations of the skin color of Japanese fall, and the boundary lines of the color adjustment area are determined such that:

$u1^* = u0^* - \Delta u$ $u2^* = u0^* + \Delta u$ $v1^* = v0^* - \Delta v$ $v2^* = v0^* + \Delta v$.

The setting in the various setting devices can be done during the manufacturing of the television set or can be done at each user. In the latter case, a suitable adjustment device such as a variable resistor (not shown) should be provided. An example of the color adjustment area is shown in FIG. 3a in which the preselected chromaticity signal (u0*, v0*) is located at the center of the color adjustment area.

The weighting coefficient setting device 6 determines the weighting coefficient W indicating the degree of color adjustment within the color adjustment area set by the area setting device 4 according to the input chromaticity signal (u*v*). The weighting coefficient W is one (1) at the center of the color adjustment area, i.e., at a point corresponding to the preselected chromaticity signal (u0*, v0*), and is gradually, preferably linearly, reduced to zero (0) towards the boundary line. The weighting coefficient W outside the boundary line is zero. Therefore, the weighting coefficients W plotted over the color adjustment area would be in a shape of a pyramid. Any other shape, such as a cone, can be used.

A calculator 7 outputs the color-adjusted chromaticity signal (uc*, vc*) by applying the weighting coefficient W determined by the weighting coefficient setting device 6 to the chromaticity signal (u*, v*) in the color space converter 1 output and the chromaticity signal (u0*, v0*) output from the chromaticity value setting device 2. For example, the color-adjusted chromaticity signal (uc*, vc*) can be given by the following equation (1a).

$$uc^* = (1-W) \times u^* + W \times u0^*$$

$$vc^* = (1-W) \times v^* + W \times v0^* \quad (1a)$$

Another calculator 8 outputs the color-adjusted luminance signal (Lc*) by applying the weighting coefficient W determined by the weighting coefficient setting device 6 to the luminance signal (L*) produced from the color space converter 1 and the luminance signal (Lg*) produced from the luminance value setting device 3. For example, the color-adjusted luminance signal (Lc*) can be given by the following equation (1b).

$$Lc^* = (1-W) \times L^* + W \times Lg^* \quad (1b)$$

A color space reconverter 9 then converts the chromaticity signal (uc*, vc*) output from the calculator 7 and the luminance signal (Lc*) output from the other calculator 8 to the R G B signal.

Figure 2:
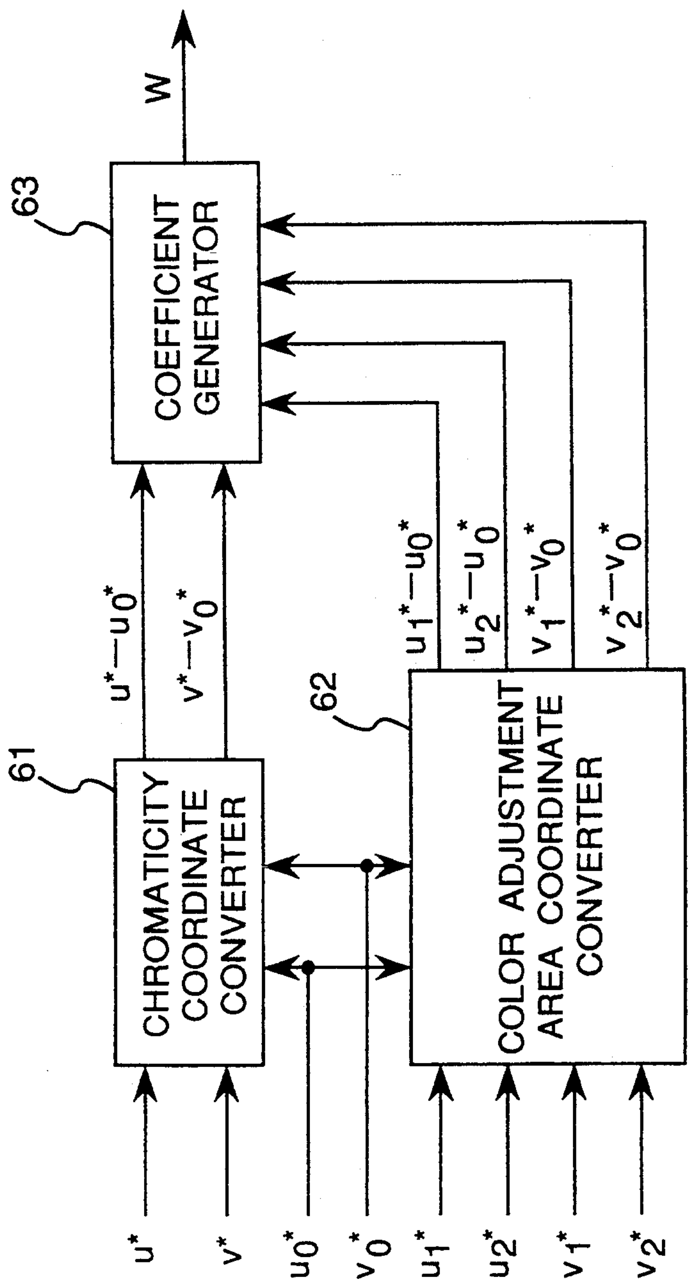
FIG. 2 is a block diagram of the weighting coefficient setting means in FIG. 1, FIGS. 3*a* and 3*b* show two graphs, respectively, used to describe the operation of the chromaticity coordinate converter and the color adjustment area coordinate converter.

As shown in FIG. 2, the weighting coefficient setting device 6 comprises a chromaticity coordinate converter 61, a color adjustment area coordinate converter 62, and a coefficient generator 63.

The chromaticity coordinate converter 61 converts the coordinates of the chromaticity plane in the uniform observer color space so that the chromaticity coordinates of the reference color are the origin (0, 0) of the plane. This is achieved by vector subtraction of the preselected reference chromaticity (u0*, v0*) from the input chromaticity signal (U*, v*).

The color adjustment area coordinate converter 62 applies similar coordinate conversion to the color adjustment area (u1*, u2*, v1*, v2*) set by the area setting device 4.

The coefficient generator 63 then generates the weighting coefficient W based on the chromaticity signal (u*-u0*, v*-v0*) output from the chromaticity coordinate converter 61, and the new color adjustment area (u1*-u0*, u2*-u0*, v1*-v0*, v2*-v0*) output by the color adjustment area coordinate converter 62.

Figure 3B:
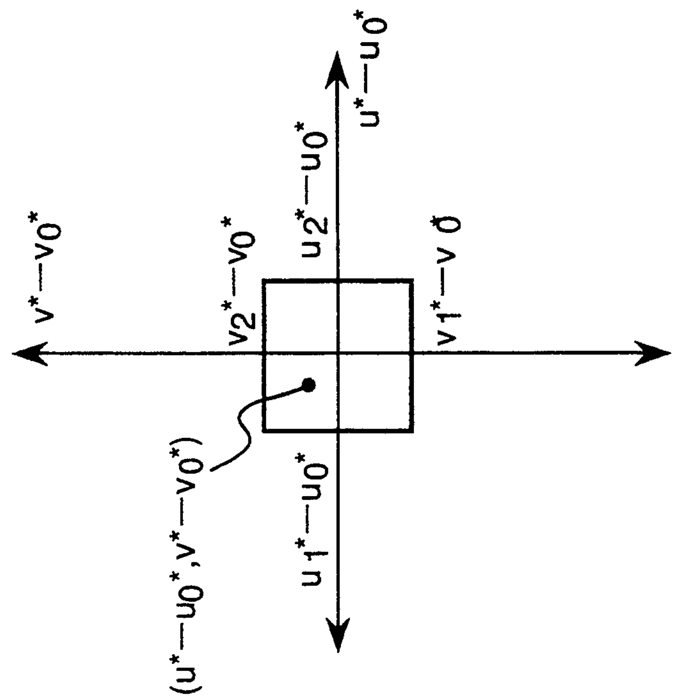
Figure 3A:
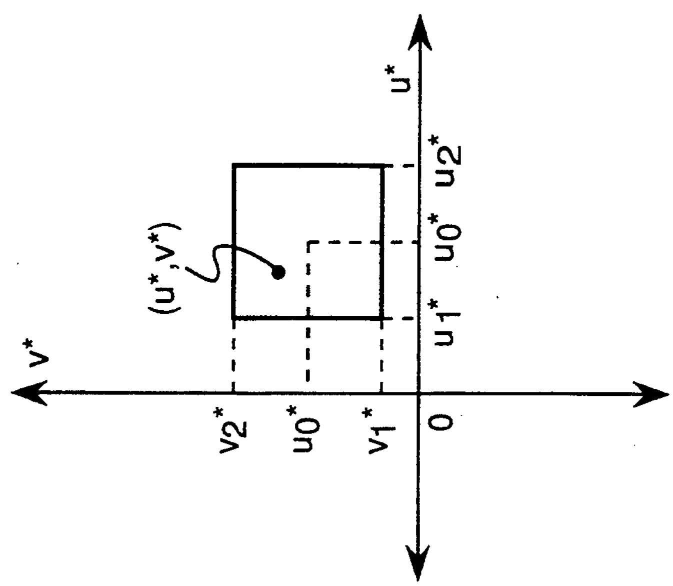

FIGS. 3a and 3b show two graphs used to describe the operation of the chromaticity coordinate converter 61 and the color adjustment area coordinate converter 62. As shown in FIG. 3a, coordinate conversion is applied so that the preselected chromaticity signal (u0*, v0*) expressing the reference chromaticity signal (representing a typical skin color of a Japanese according to the above example) is shifted to the origin (0, 0) of the new coordinate space. Note that the square area in FIG. 3a represents the color adjustment area set by the area setting device 4, and in FIG. 3b represents the color adjustment area set by the color adjustment area coordinate converter 62. Also, the chromaticity signal (u*, v*) (FIG. 3a) obtained from the color space converter 1 is shifted to new chromaticity signal (u*-u0*, v*-v0*) (FIG. 3b) by the chromaticity coordinate converter 61.

Figure 4:
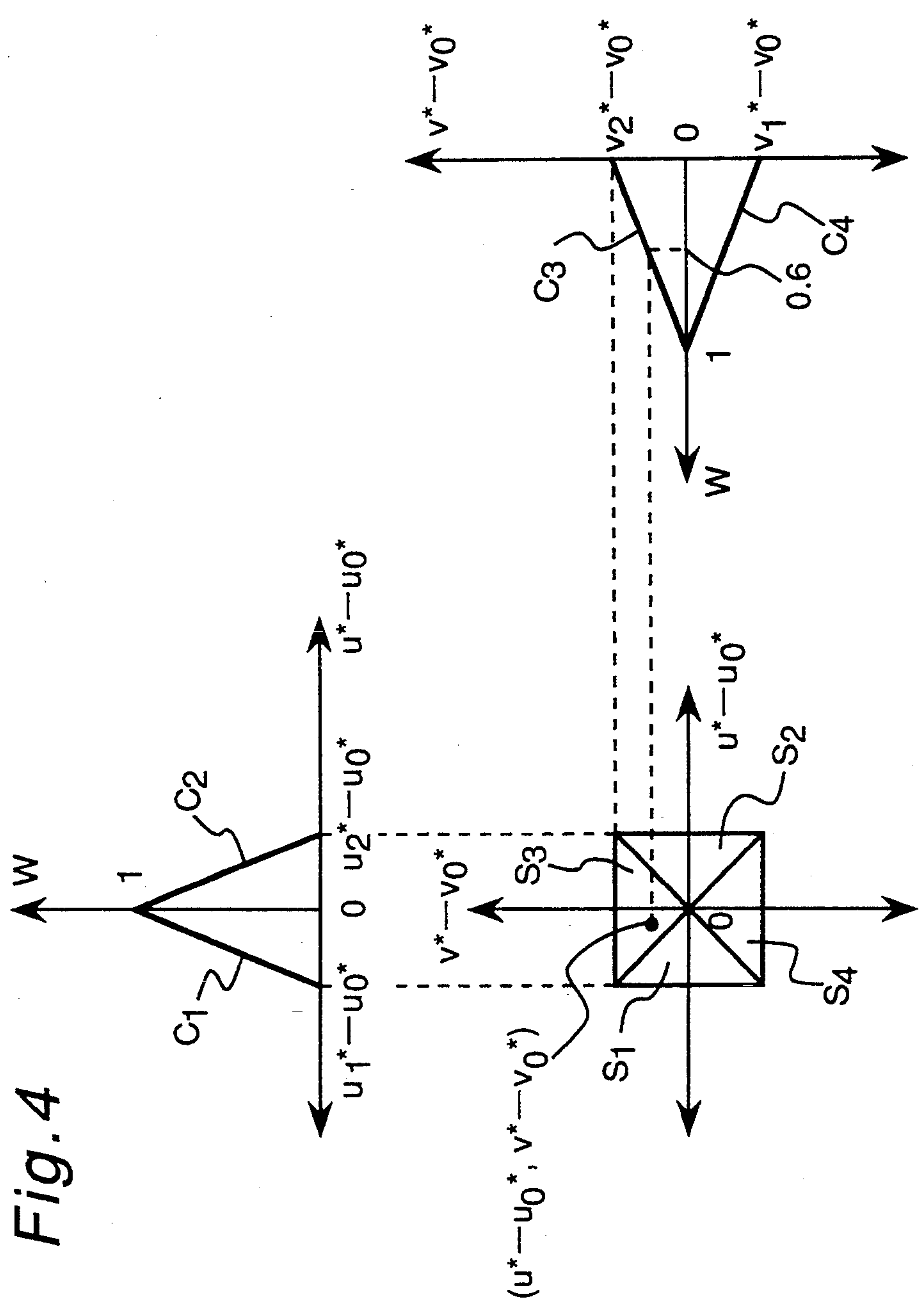
FIG. 4 is a graph showing the input/output characteristics of the coefficient generator.

As shown in FIG. 4, a graph of the weighting coefficient W generated by the coefficient generator 63 over the coordinate space output by the chromaticity coordinate converter 61, the weighting coefficient W is greatest (W=1) when the chromaticity signal (u*, v*) input to the chromaticity coordinate converter 61 is at the origin (0, 0) of the coordinate space (i.e., when (u*, v*) equals the preselected reference chromaticity signal (u0*, v0*)), decreases as (u*, v*) moves from the origin to the spatial boundary, and is zero (0) at and outside the boundaries of the coordinate space. For simplicity, a linear distribution is used in this embodiment. According to the example shown in FIG. 4 the detected chromaticity signal (u*-u0*, v*-v0*) which falls within the sections S1 and S2 in the color adjustment area is determined by the weighting coefficient line C1 and C2, respectively, and the detected chromaticity signal (u*-u0*, v*-v0*) which falls within the sections S3 and S4 in the color adjustment area is determined by the weighting coefficient line C3 and C4, respectively. Thus, the chromaticity signal (u*-u0*, v*-v0*) shown in FIG. 4 is in section S3 and takes a weighting coefficient W of 0.6 according to weighting coefficient line C3. These lines C1–C4 are given as an example, and can be changed to any desired shape.

According to one preferred embodiment, in coefficient generator 63 a suitable memory for carrying a table is provided. The table is previously stored with data along lines C1–C4 to convert the received chromaticity signal (u*-u0*, v*-v0*) to a weighting coefficient W. Instead of a memory, a suitable calculator may be provided to calculate the weighting coefficient W in response to the received chromaticity signal.

Figure 5A:
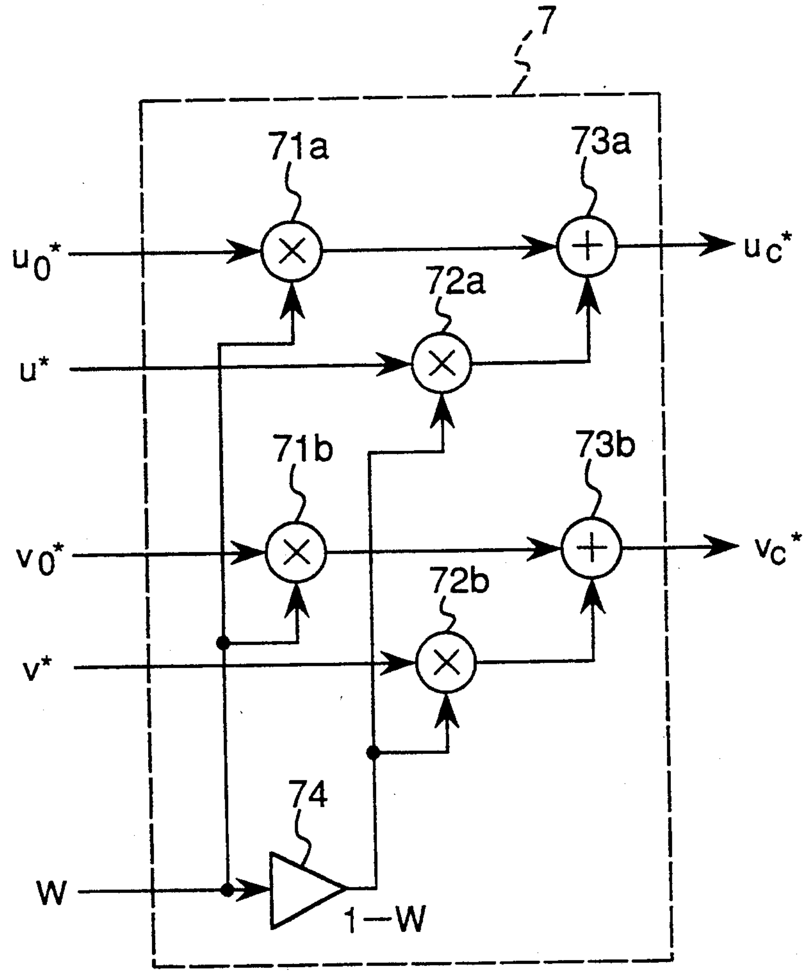
FIGS. 5*a* and 5*b* are respectively circuit diagrams of the calculators shown in FIG. 1.
Figure 5B:
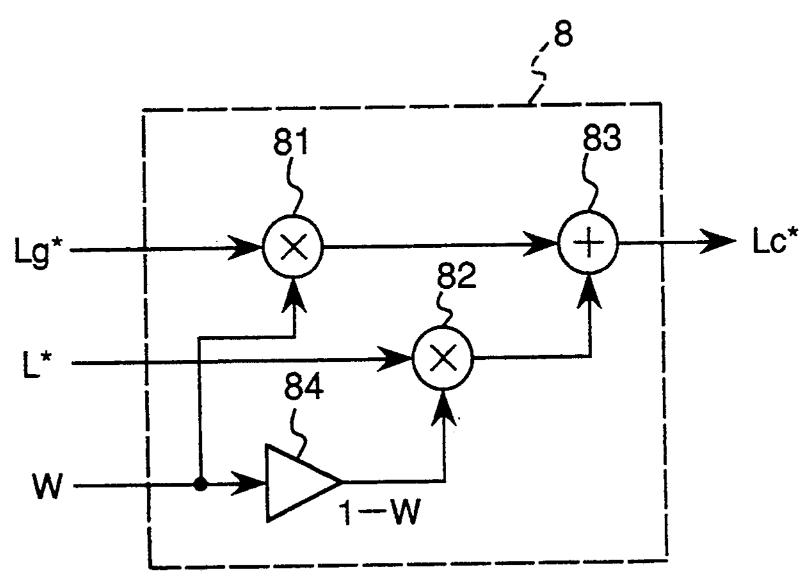

Referring to FIGS. 5*a* and 5*b*, calculators 7 and 8 are shown, each comprises an inverter 74, 84, respectively, for outputting the complement (1-W) of the weighting coefficient W.

The first calculator 7 further comprises multipliers 71*a* and 71*b* for respectively multiplying the chromaticity values (u0*, v0*) output by the chromaticity value setting device by the weighting coefficient W, multipliers 72*a* and 72*b* for multiplying the chromaticity values (u*, v*) output from the color space conversion means 1 by the weighting coefficient complement (1-W), and adders 73*a* and 73*b* for adding the outputs of multipliers 71*a* and 72*a*, and 71*b* and 72*b*, respectively.

The other calculator 8 also comprises a multiplier 81 for multiplying the reference luminance value (Lg*) output from the luminance value setting device by the weighting coefficient W, a multiplier 82 for multiplying the luminance signal (L*) output from the color space conversion means 1 by the weighting coefficient complement (1-W), and an adder 83 for adding the outputs from the two multipliers 81 and 82.

As a result, the calculator 7 internally divides the chromaticity signal (u*, v*) produced from the color space converter 1 and the preselected reference chromaticity signal (u0*, v0*) by the weighting coefficient W. Similarly, the calculator 8 internally divides the luminance signal (L*) from the color space converter 1 and the preselected reference luminance signal (Lg*). The equations used for these operations are shown in the above give equations (1*a*) and (1*b*).

Figure 6:
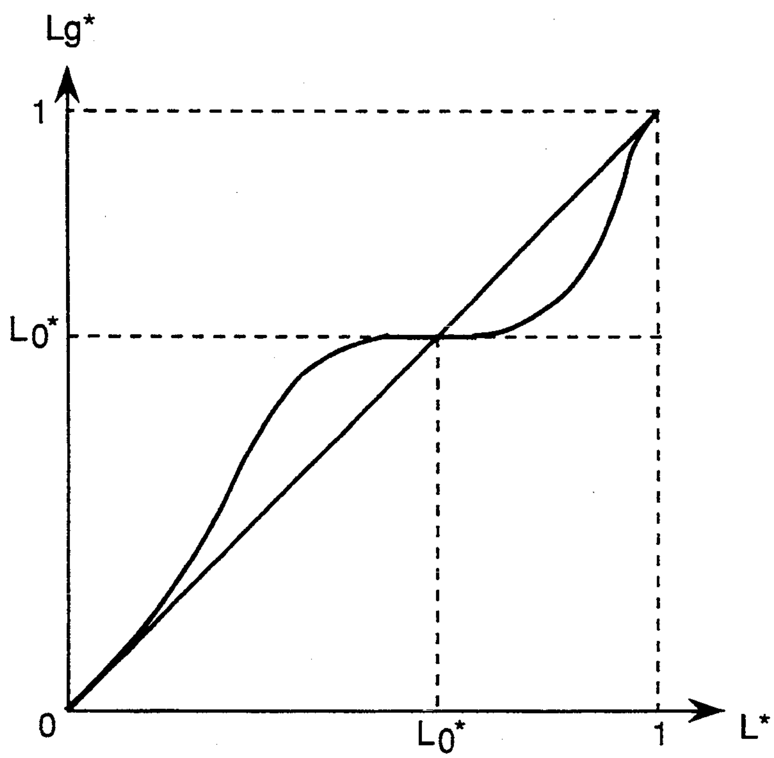
FIG. 6 is a graph of the input/output characteristics of the luminance value setting means.

FIG. 6 shows a graph of the input/output characteristics of the luminance value setting device 3. The chromaticity value expressing the hue and saturation of the remembered color is a preselected value (u0*, v0,) set by the chromaticity value setting device 2. While it is also possible to use a preselected value (L0*) for the luminance reference value of the remembered color, a function of the luminance input as shown in FIG. 6 is used in this embodiment to obtain a more natural image. According to a preferred embodiment, the luminance value setting device 3 has a memory (not shown) stored with a table for obtaining a preferred luminance signal (Lg*) with respect to input luminance signal (L*).

For example, the luminance value setting device 3 sets the preselected luminance signal (L0*) which represents a typical skin brightness (luminance) of a Japanese and would appear to the viewers most natural skin brightness of a Japanese. The skin brightness of a Japanese in the video signal is not always the same as the preselected chromaticity signal (u0*, v0*) but deviates towards dark or brighter. When the skin brightness in the video signal is darker than the preselected luminance (L0*), the brightness of the skin is automatically made brighter, i.e., closer to the preselected luminance (L0*) to make the skin brightness look natural in the screen. On the other hand, when the skin brightness in the video signal is brighter than the preselected luminance (L0*), the brightness of the skin is automatically made darker, i.e., closer to the preselected luminance (L0*). Therefore, even if the entire picture on the screen is over-lighted to show bright or whitish image, the brightness at the skin portion is made darker to make the skin portion look more natural.

The object of providing the luminance value setting device 3 and the calculator 8 is to avoid an unnaturally large correction of the image luminance when the luminance of the input color differs greatly from that of the remembered color even though the hue and saturation enable a color to be identified as the predetermined remembered color.

The operation of this first embodiment is described below with reference to FIGS. 1–6.

The first step is conversion of the input R G B color signal to a CIE 1976 uniform observer color space (L*, u*, v*) signal by the color space converter 1. This conversion is achieved in two stages as expressed by equations (2) (step 1) and (3) (step 2).

$$X=0.607R+0.173G+0.200B$$

$$Y=0.299R+0.586G+0.115B$$

$$Z=0.066G+1.116B \quad (2)$$

$$L^*=116\times(Y/Y0)^{(1/3)}-16$$

$$u^*=13\times L^*\times(u-u0)$$

$$v^*=13\times L^*\times(v-v0) \quad (3)$$

where u=4X/(X+15Y+3Z)

v=6Y/(X+15Y+3Z)

Y0=1 u0=0.20089 v0=0.30726

The chromaticity values (u*, v*) of the chromaticity plane not including luminance in the CIE 1976 uniform observer color space (L*, u*, v*) express the hue and saturation components in polar coordinates. It is therefore possible to adjust the color in this plane while keeping the luminance constant.

Figure 7:
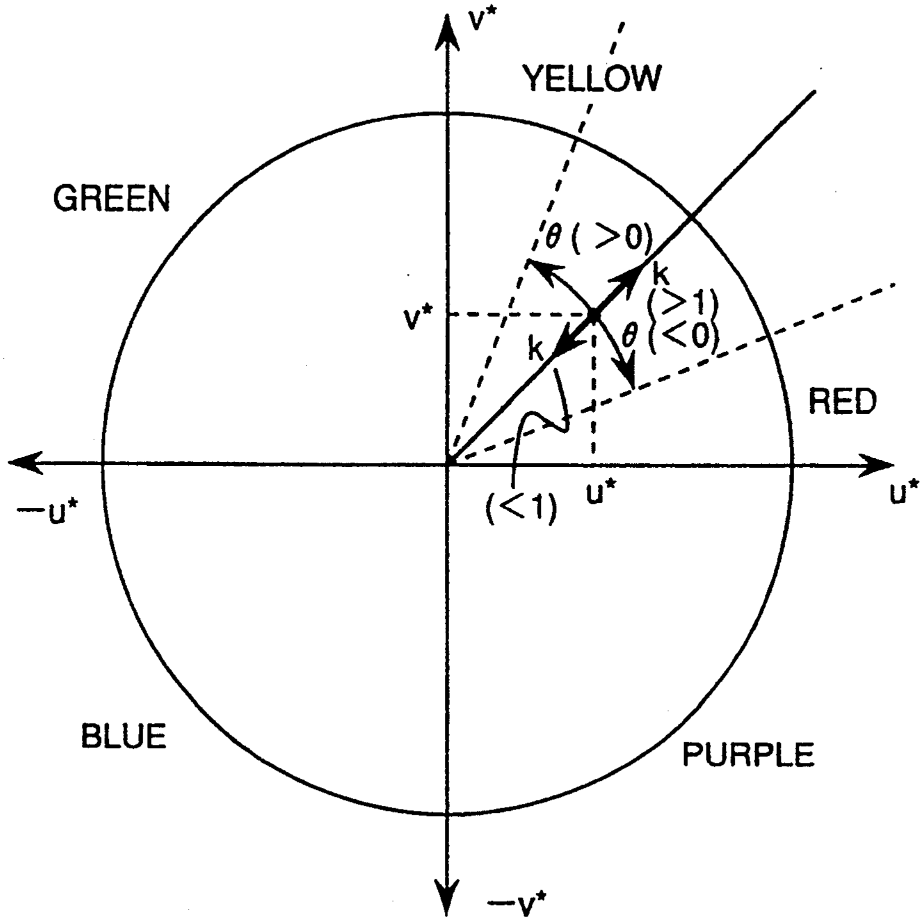
FIG. 7 is a graph used to describe the conventional color correction concept on the chromaticity plane.

FIG. 7 is a graph used to describe the conventional color correction concept on the chromaticity plane. By converting the chromaticity (u*, v*) of a color to polar coordinates and rotating the axis q degrees, the hue axis is shifted and the saturation is increased k times where k is the distance of the shift from the origin (0, 0).

The operation of the area setting device 4 is described next.

To simplify the construction of the present embodiment, the shape of the area set by the area setting device 4 is a rectangle parallel to axes u* and v* that contains the reference chromaticity (FIG. 4). It is also possible for the shape of this area to be any other desired shape based on the distribution in the chromaticity plane of the color corresponding to the desired remembered color.

The weighting coefficient setting device 6 determines the weighting coefficient W according to the distance between the chromaticity values (u*, v*) of the input color and the reference chromaticity values (u0*, v0*). Weighting coefficient setting device 6 operation is described in greater detail below with reference to FIGS. 2, 3*a*, 3*b*, and 4.

As shown in FIG. 3*a*, the chromaticity signal (u*, v*) input to the weighting coefficient setting device 6 is converted by the chromaticity coordinate converter 61 so that the coordinates of the chromaticity signal (u0*, v0*) expressing the chromaticity coordinates of the target color are shifted to the origin of the coordinate system (FIG. 3*b*).

The input/output characteristics of the coefficient generator 63 are then obtained based on the color adjustment area (u1*-u0*, u2*-u0*, v1*-v0*, v2*-v0*) obtained by coordinate conversion by the color adjustment area coordinate converter 62 of the color adjustment area (u1*, u2*, v1*, v2*) set by the area setting device 4.

The weighting coefficient W is set to be greatest (W=1) when the origin of the coordinate converted space, i.e., the input chromaticity signal, is the target color, to decrease continuously as chromaticity signal moves from the origin to the spatial boundary, and to equal zero (0) at and outside the boundaries of the coordinate space. It is to be noted that the coefficient generator 63 can be easily achieved using a look-up table stored in a memory.

The color-adjusted chromaticity signal (uc*, vc*) is obtained from the internal division operation (equation (1*a*)) executed by the calculator 7 by applying the weighting coefficient W determined by the weighting coefficient setting device 6 to the preselected reference chromaticity signal (u0*, v0*) and the chromaticity signal (u*, v*) from the color space converter 1.

The color-adjusted luminance signal (Lc*) is similarly obtained from the internal division operation (equation (1*b*)) executed by the calculator 8 by applying the weighting coefficient W to the reference luminance signal (Lg*) and the luminance signal (L*) from the color space converter 1.

Figure 8:
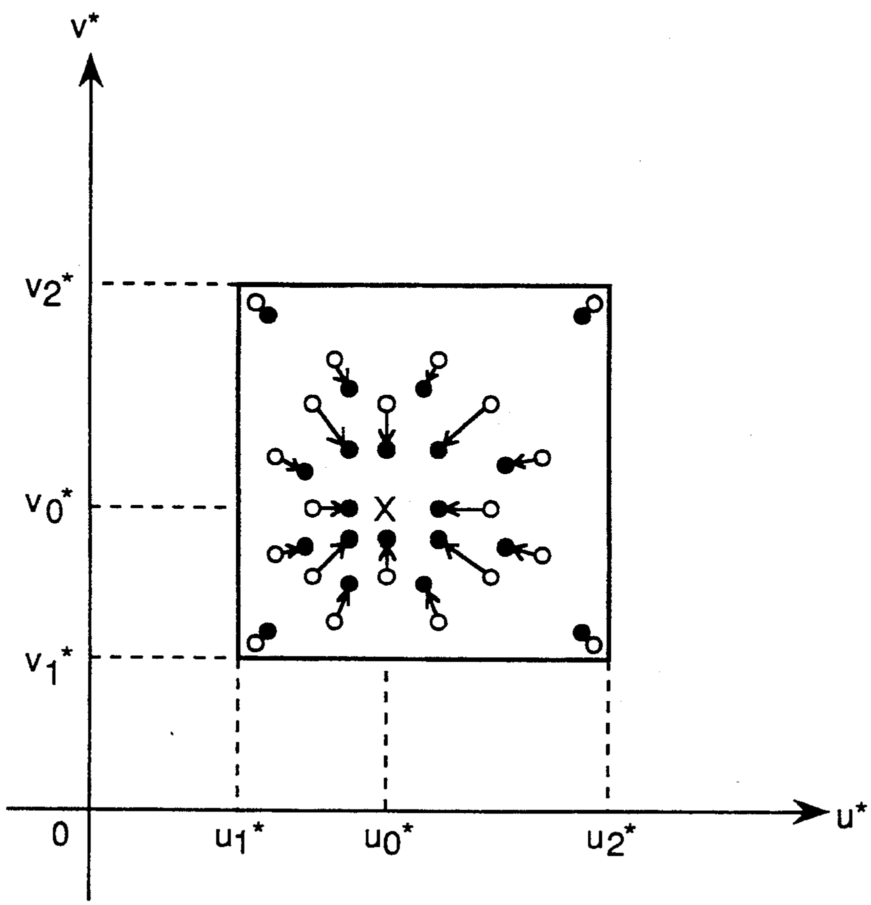
FIG. 8 is chromaticity diagram showing the effect of the color adjustment operations performed by the invention.

An actual example of the color adjustment operations performed by the invention is shown in FIG. 8. In this example the input/output characteristics of the coefficient generator 63 are those shown in FIG. 4, and the reference luminance value is determined by the graph shown in FIG. 6.

Note that FIG. 8 is the chromaticity plane and as such can only express changes in hue and saturation; any change in luminance cannot be expressed in this figure.

In FIG. 8, the mark (x) indicates the preselected reference chromaticity value, open circles indicate the chromaticity value input from the color space converter 1, and solid dots indicate the chromaticity value after color adjustment. As will be understood from this figure, the chromaticity coordinates after color adjustment are varied in a natural manner approaching the preselected reference chromaticity value. The characteristics of this change include:

(a) no change occurs when the input equals the reference chromaticity value;

(b) there is no change in input colors outside the set area;

(c) the degree of change is greatest in midrange chromaticity values between the reference chromaticity value and the boundaries of the set area; and (d) the change in all chromaticity values inside the set area is continuous, and there is no inversion of values.

As a result, most color inside the set area is corrected in a natural manner approaching the reference chromaticity value defined as the remembered color, and unnatural color changes can be prevented.

It is possible to obtain such outstanding adjustment results even through the coefficient generator 63 operates in a simple linear characteristic. This is because the internal division operation on which color adjustment of this invention is based. According to a preferred embodiment, the weighting coefficient changes linearly with respect to the distance between the input chromaticity value and the preselected reference chromaticity value, and the internal division operation is also linear to this distance. In addition, because the corrected chromaticity value is the variable product of these two values, the chromaticity change is a secondary function resulting in a parabolic change.

Figure 9:
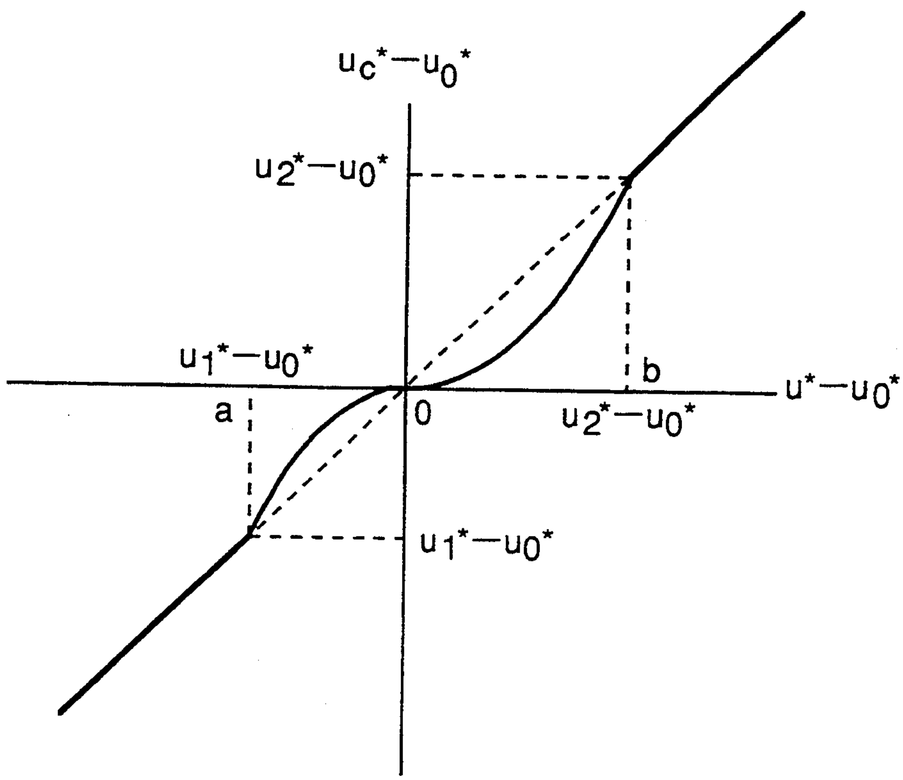
FIG. 9 is a graph of the input/output characteristics of the chromaticity showing the color adjustment effect of the invention.

FIG. 9 shows a graph in which the axis of the abscissa is the horizontal distance between the input chromaticity value and the reference chromaticity value, and the axis of the ordinates is the horizontal distance between the output chromaticity value and the reference chromaticity value. Points a and b in the FIG. 9 are the horizontal distance between the boundary of the set area and the reference chromaticity value. As shown in this graph, the resulting curve is a combination of two parabolas joined at the origin. There is no change at the origin and at the boundaries of the set area while colors on both sides of the origin are corrected to naturally approach the origin. There is also no inversion of the hue and saturation characteristics, and the colors change on a smooth curve. In addition, the degree of change from the original chromaticity (indicated by the dotted line) is greatest through the midpoint of the range.

The adjustment of colors towards the origin can also be freely controlled by changing the characteristics of the weighting coefficient setting device 6.

Figure 10:
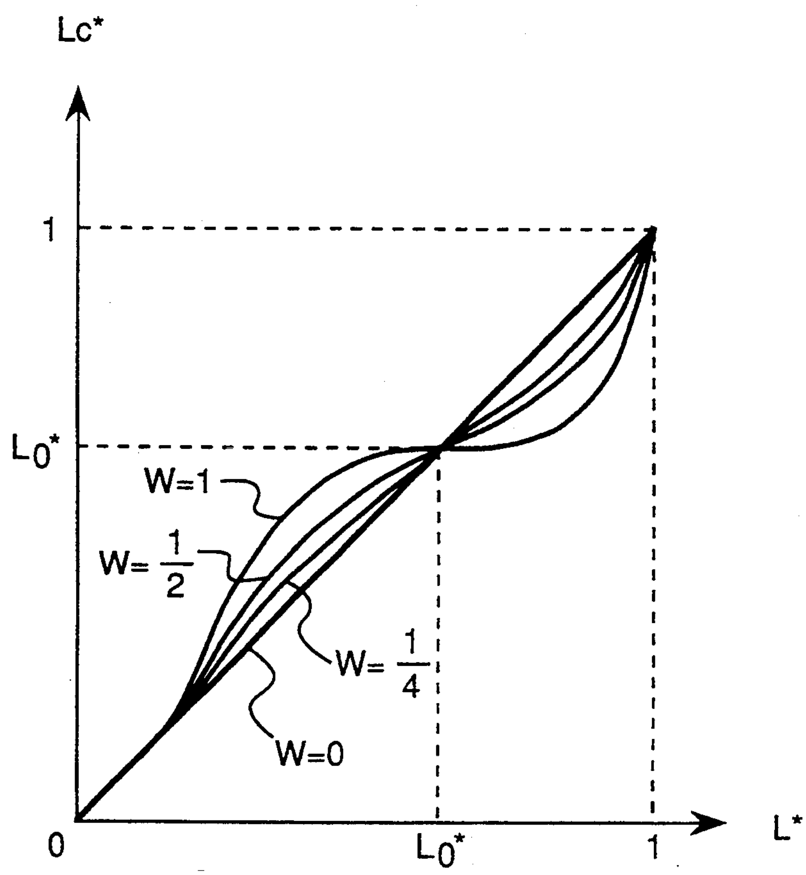
FIG. 10 is a graph of the luminance input/output characteristics showing the color adjustment effect of the invention.

FIG. 10 shows a graph of characteristics of the luminance output (Lc*) produced from the calculator 8 relative to the luminance input (L*). This graph shows the change in the input/output characteristics relative to luminance when the weighting coefficient W changes based on the input chromaticity value (L*).

When the input chromaticity is near the reference chromaticity, i.e., $W \approx 1$, the luminance input/output characteristics match the reference luminance output shown in FIG. 6, and the input luminance value is adjusted to approach the luminance (L0*) of the remembered color. Furthermore, when the input chromaticity is far from the reference chromaticity, i.e., W≈0, there is no luminance correction.

As a result, if the remembered color is skin color and the chromaticity value of the input is determined to be within the range of skin colors, the luminance is also adjusted to approach the desirable skin color luminance level, but there is no change in the luminance of all other non-skin colors.

It is to be noted that this embodiment is described with the color space converter 1 converting the color signal to CIE 1976 uniform observer color space (L*, u*, v*) signals, but is it also possible to convert the color signal to the CIE 1976 uniform observer color space (L*, a*, b*), color luminance difference signals (e.g., R—Y, B—Y, or Y, U, V signals), or another color system with the same effect. Conversion between color luminance difference signals and RGB or NTSC formats is particularly easy, and the practical benefits obtained in this system are high.

For example, instead of (L*, u*, v*), the color space converter 1 may produce (Y, R—Y, B—Y). In this case, chromaticity value setting device 2 produces, instead of (u0*, v0*), {(R—Y)0, (B—Y)0}; area setting device 4 produces, instead of (u1*, v1*, u2*, v2*), {(R—Y)1, (B—Y)1, (R—Y)2, (B—Y)2}; luminance value setting device produces, instead of (Lg*), (Yg); and calculators 7 and 8 produce, instead of (Lc*, uc*, vc*), {Yc, (R—Y)c, (B—Y)c}.

Furthermore, a chromaticity coordinate converter 61 and color adjustment area coordinate converter 62 are provided in the weighting coefficient setting device 6 to generate the weighting coefficient W after moving the reference chromaticity value to the origin, but it is also possible to generate the weighting coefficient on the chromaticity plane without coordinate conversion.

As described hereinabove, the weighting coefficient is determined by the weighting coefficient setting device according to the difference between the input and reference chromaticity values in the chromaticity plane of hue and saturation components for the reference chromaticity value set by the chromaticity value setting device and the input chromaticity value of the set area that includes the reference chromaticity value. The output chromaticity value is then determined from the input and reference chromaticity values according to the weighting coefficient. It is therefore possible to achieve natural color adjustment while maintaining color continuity without inverting colors inside and outside the color adjustment area, and naturally correct colors near the remembered color to the remembered color.

In addition, because processing is also possible on a rectangular coordinate system without converting the chromaticity plane to a polar coordinate system, complex non-linear conversions to a polar coordinate space are avoided. This makes it possible to achieve the invention with an extremely simple construction and small circuit scale.

In particular, if the color space converted by the color space converter is expressed by a color luminance difference signal, the need for all non-linear operations is eliminated, and real-time processing with a small device is possible.

Figure 11:
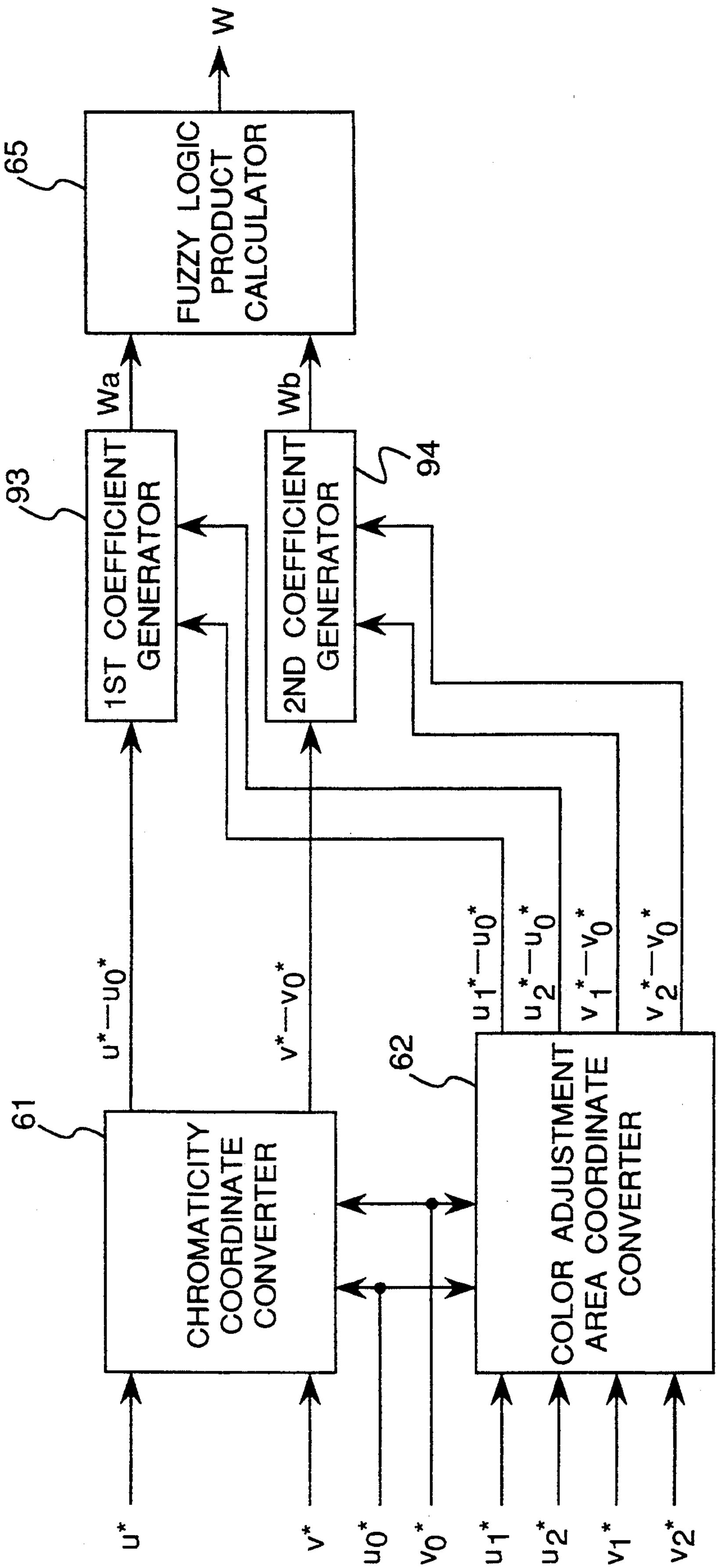
FIG. 11 is a block diagram of the weighting coefficient setting means in a second embodiment of a color adjustment apparatus according to the invention.

The second embodiment of the invention is described below. The second embodiment is the same as the first shown in FIG. 1 above except for the construction of the weighting coefficient setting device 6. The weighting coefficient setting device 6 of this embodiment is shown in FIG. 11. As the construction and operation of this embodiment are the same as in the first embodiment described above with the exception of the weighting coefficient setting device 6, the construction and operation of the weighting coefficient setting device 6 only are described further below.

Figure 12A:
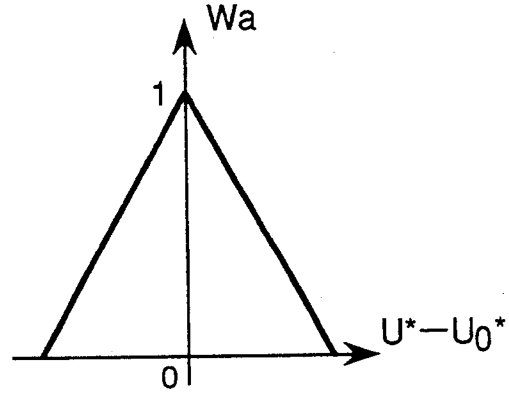
FIGS. 12*a*, 12*b* and 12*c* are graphs used to describe the operation of the weighting coefficient setting means in the second embodiment.
Figure 12B:
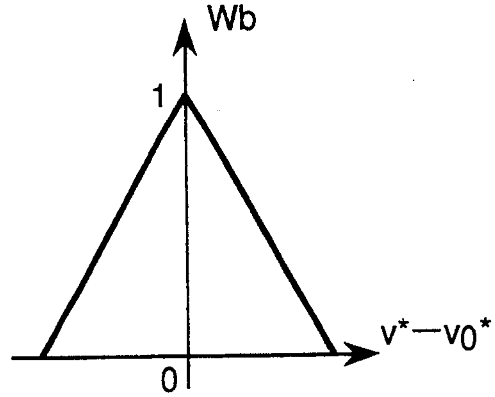
Figure 12C:
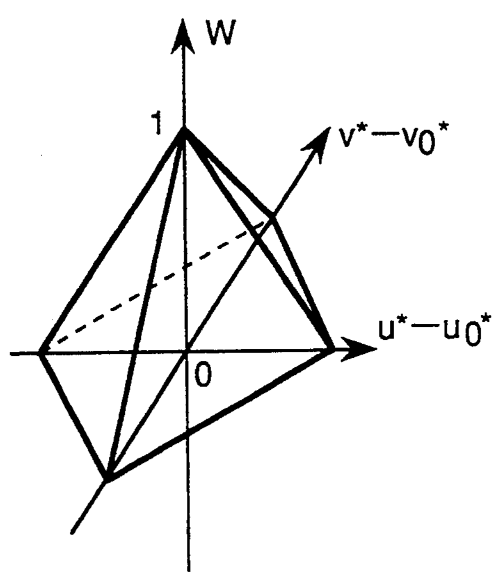

FIGS. 12a–12c are graphs used to describe the operation of the weighting coefficient setting device 6 in the second embodiment.

Referring to FIG. 11, the weighting coefficient setting device 6 comprises a chromaticity coordinate converter 61, a color adjustment area coordinate converter 62, a first coefficient generator 93, a second coefficient generator 94, and a fuzzy logic product calculator 65.

The chromaticity coordinate converter 61 applies coordinate conversion so that the chromaticity coordinates (u0*, v0*) expressing the target color chromaticity coordinates in the chromaticity signal (u*, v*) are shifted to the origin of the chromaticity coordinate system.

The color adjustment area coordinate converter 62 applies similar coordinate conversion to the color adjustment area (u1*, u2*, v1*, v2*) set by the area setting device 4.

The first coefficient generator 93 receives the output (u*-u0*) of the chromaticity coordinate converter 61 and outputs the weighting coefficient Wa shown in FIG. 12a based on the color adjustment area (u1*-u0*, u2*-u0*) output by the color adjustment area coordinate converter 62.

The second coefficient generator 94 receives the output (v*-v0*) of the chromaticity coordinate converter 61 and outputs the weighting coefficient Wb shown in FIG. 12b based on the color adjustment area (v1*-v0*, v2*-v0*) output by the color adjustment area coordinate converter 62.

The fuzzy logic product calculator 65 obtains the fuzzy logic product from the "min" operation shown in equation (4) based on the weighting coefficients Wa and Wb output from the first and second first coefficient generators 93 and 94, respectively. The "min" operation result is output as the weighting coefficient W shown in FIG. 12c.

$$W=\min(Wa, Wb) \quad (4)$$

The operation of this embodiment is briefly described below focusing on the weighting coefficient setting device 6 because the other components of the first and second embodiments are identical as stated above.

First, the chromaticity signal (u*, v*) input to the weighting coefficient setting device 6 is converted by the chromaticity coordinate converter 61 to a coordinate system of which the origin is the chromaticity signal (u0*, v0*) of the target color. Based on the color adjustment area (u1*-u0*, u2*-u0*, v1*-v0*, v2*-v0*) converted by the color adjustment area coordinate converter 62 from the color adjustment area (u1*, u2*, v1*, v2*) set by the area setting device 4, the first coefficient generator 93 outputs a one-dimensional weighting coefficient Wa as shown in FIG. 12a from the chromaticity coordinate converter 61 output signal (u*-u0*). The second coefficient generator 94 similarly outputs a one-dimensional weighting coefficient Wb as shown in FIG. 12b from the chromaticity coordinate converter 61 output signal (v*-v0*). The fuzzy logic product is then obtained by the "min" operation of the fuzzy logic product calculator 65 from the two one-dimensional weighting coefficients Wa and Wb generated for the input signals (u*-u0*) and (v*-v0*). The fuzzy logic product is output as the two-dimensional weighting coefficient W shown in FIG. 12c.

This weighting coefficient W is then applied as in the first embodiment above for color adjustment of luminance and chromaticity, the resulting luminance (L*) and chromaticity (uc*, vc*) signals are converted to R G B signals, and the desired color-adjusted signal is obtained.

As described hereinabove, the weighting coefficient setting device 6 according to the second embodiment has a coefficient generating means comprising two weighting coefficient generators, each generating a weighting coefficient for one of the two element axes of the chromaticity signal expressed on a plane rectangular coordinate system for the hue and saturation components of the input signal where the weighting coefficient is one (1) when on the axis, decreases continuously as the distance from the axis increases, and is zero (0) on the axis-parallel boundary of the color adjustment area determined by the color adjustment area setting device. The weighting coefficient setting device 6 according to the second embodiment further has a fuzzy logic product calculator which generates the weighting coefficient by obtaining the fuzzy logic product of the two weighting coefficient generator outputs. The input/output characteristics of the weighting coefficient setting device can be expressed in one dimension, the fuzzy logic product calculator can be simply constructed, and the input/output characteristics can be easily determined.

For simplicity, the chromaticity value setting device 2 is described in this embodiment as setting a fixed desirable chromaticity value for the remembered color, but this chromaticity value can also be varied according to another signal. For example, because the chromaticity value of the desirable skin color often varies slightly according to the luminance, the automatic color adjustment correction performance with a remembered color can be improved by varying the reference chromaticity value according to the luminance signal.

Furthermore, while the reference luminance value is described in these embodiments as a variable function of the luminance signal, it can also be fixed to simplify the construction.

As described hereinabove, a color adjustment apparatus according to the present invention can apply color adjustment to only selected colors without changing the colors outside the desired color adjustment area by operating on a chromaticity plane defined by the hue and saturation components of the three color attributes.

Color adjustment applied by the present invention can automatically shift, for example, the input skin color toward the skin color of the desired remembered color by using the remembered color as the reference chromaticity value, naturally shifting the hue and saturation toward the reference chromaticity value on a chromaticity plane, and naturally shifting the input signal luminance towards the reference luminance value. This color adjustment process retains color continuity, does not invert colors, and can thus achieve a natural color adjustment.

As a result, "desirable color reproduction" is obtained such that skin color and other important subjective remembered colors are automatically adjusted to the expected or subjectively desired color is possible in hard copy output devices such as video printers by which the hard copy is separated from the original image. This desirable color reproduction is even possible with amateur video recordings and photography in which the subjects do not wear special make-up and special video lighting is often not used.

Furthermore, the present invention can be achieved with an extremely simple circuit construction and small circuit scale because chromaticity values are processed on a rectangular coordinate system that eliminates the need for complex non-linear conversions to polar coordinates.

In addition, if the color space converted by the color space conversion means is expressed by luminance color difference signals, non-linear operations are not required, and the invention can be achieved on a small scale enabling real-time signal processing.

Finally, if the weighting coefficients are generated using a fuzzy logic product, a large ROM table is not needed, and single-chip large-scale integration of the weighting coefficient setting device is easier.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color adjustment apparatus which receives an input luminance signal and an input chromaticity signal comprising:

chromaticity value setting means for setting a preselected reference chromaticity value;

area setting means for setting an area on a chromaticity plane that includes said preselected reference chromaticity value;

weighting coefficient setting means for setting a weighting coefficient that is zero outside said area as set by said area setting means and gradually increases to one as a distance between said preselected reference chromaticity value and said input chromaticity signal becomes small; and first calculation means for internally dividing said input chromaticity signal and said preselected reference chromaticity value based on said weighting coefficient and for producing a color-adjusted chromaticity signal.

2. A color adjustment apparatus according to claim 1, further comprising:

luminance value setting means for setting a preselected reference luminance value;

second calculation means for internally dividing said input luminance signal and said preselected reference luminance value based on said weighting coefficient and for producing a brightness-adjusted luminance signal.

3. A color adjustment apparatus according to claim 2, wherein the luminance value setting means sets the input luminance signal to a converted output luminance signal such that the output luminance signal changes slowly with respect to the change of the input luminance signal in a region vicinity of a predetermined preselected luminance.

4. A color adjustment apparatus according to claim 1, further comprising converter means for converting an input R G B signal to said input chromaticity signal and said input luminance signal.

5. A color adjustment apparatus according to claim 1, wherein said weighting coefficient setting means comprises:

chromaticity coordinate conversion means, using the reference chromaticity value as an origin, for converting said input chromaticity signal to a shifted input chromaticity signal in a shifted chromaticity coordinate system, color adjustment area coordinate converter means for converting the area as set by said area setting means to a shifted area in said shifted chromaticity coordinate system, and coefficient generating means, in response to the shifted input chromaticity signal, for generating the weighting coefficient which is one when the shifted input chromaticity signal is equal to the origin of said shifted chromaticity coordinates system, and decreases gradually as a distance between the shifted input chromaticity signal and the origin increases, and is zero when the shifted input chromaticity signal is at a boundary of said shifted area.

6. A color adjustment apparatus according to claim 1, wherein said area setting means sets a rectangular chromaticity plane.

7. A color adjustment apparatus according to claim 6, wherein said weighting coefficient setting means comprises first coefficient generating means for generating a first one-dimensional weighting component over a first axis of two coordinates axes of the chromaticity plane;

second coefficient generating means for generating a second one-dimensional weighting component over a second axis of two coordinates axes of the chromaticity plane; and fuzzy logic product calculation means for obtaining a fuzzy logic product of said first and second one-dimensional weighting components, and for generating a final weighting coefficient.

8. A color adjustment apparatus which receives an input luminance component signal and an input chromaticity signal comprising:

chromaticity value setting means for setting a preselected reference chromaticity value;

area setting means for setting an area on a chromaticity plane that includes said preselected reference chromaticity value;

weighting coefficient setting means for setting a weighting coefficient that is zero outside said area as set by said area setting means and gradually increases to one as a distance between said preselected reference chromaticity value and said input chromaticity signal becomes small;

luminance value setting means for setting a preselected reference luminance value;

calculation means for internally dividing said input luminance component signal and said preselected reference luminance value based on said weighting coefficient and for producing a brightness-adjusted luminance signal.

* * * * *